Jan. 29, 1957 W. W. CRISSINGER 2,779,900
SWITCH MEMBER
Filed April 7, 1953 2 Sheets-Sheet 1

INVENTOR.
Woodrow W. Crissinger,
BY
Brown, Jackson, Boettcher & Diemer
attys.

Jan. 29, 1957 W. W. CRISSINGER 2,779,900
SWITCH MEMBER
Filed April 7, 1953 2 Sheets-Sheet 2
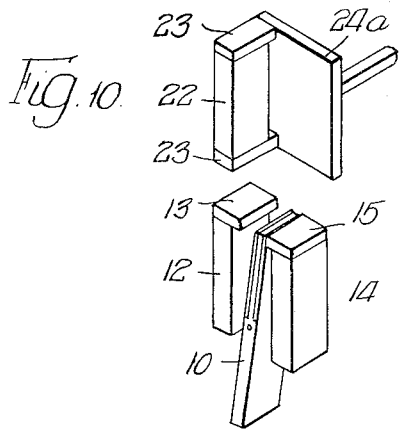
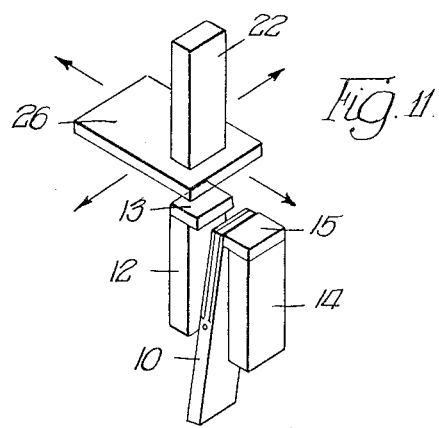
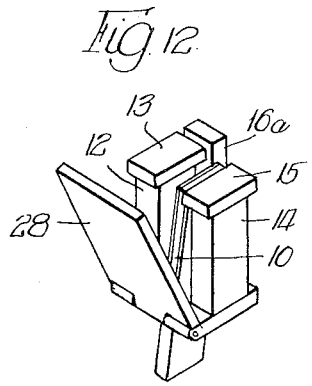
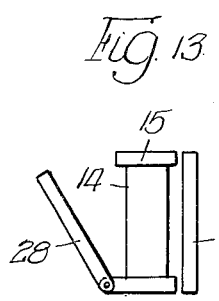
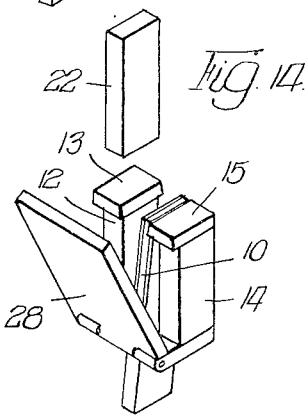
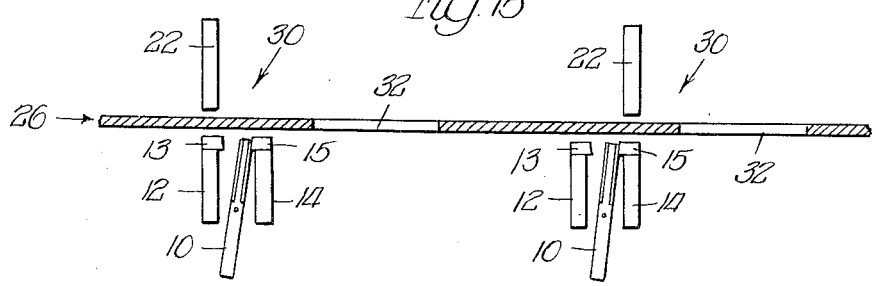
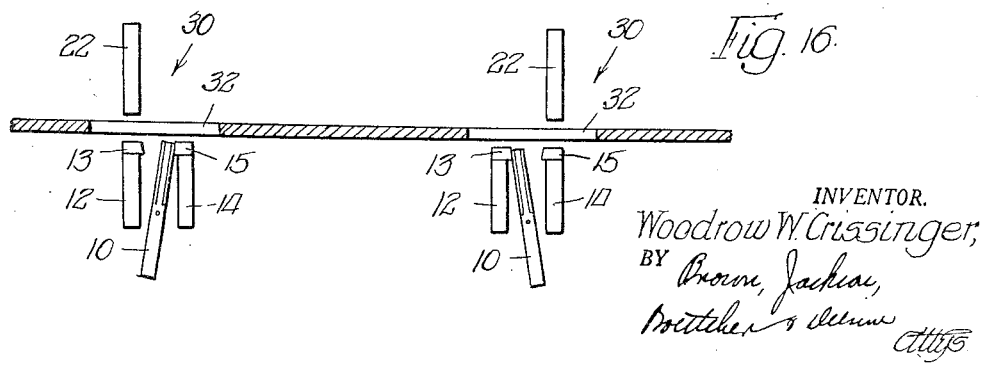
INVENTOR.
Woodrow W. Crissinger,
BY Brown, Jackson,
Boettcher & Dienner
ATTYS.

United States Patent Office 2,779,900
Patented Jan. 29, 1957

2,779,900

SWITCH MEMBER

Woodrow W. Crissinger, Galion, Ohio, assignor to North Electric Company, Galion, Ohio, a corporation of Ohio Application April 7, 1953, Serial No. 347,193

17 Claims. (Cl. 317—177)

The present invention relates in general to a novel switching unit, and particularly to a novel switching unit which utilizes magnetic means for effecting armature actuation and associated contact operation.

The problem of providing a switch member adapted to hermetic sealing which will operate reliably in equipment which is frequently subjected to shock and vibration forces of excessive values is continually encountered in the industrial and military fields. A few of the excessive demands which are made of switching units in these various fields have been set forth in some detail in my copending applications Serial No. 273,296, which was filed February 25, 1952; Serial No. 348,750, which was filed April 14, 1953; and Serial No. 396,127, which was filed December 4, 1953 which applications have been assigned to the assignee of this invention.

Each of these applications teach a different switch member which affords a solution to the various problems encountered in these fields. The basic structure of these switches in each instance comprises a magnetic means for providing at least a pair of permanent magnet fields, an armature, and an actuator member physically independent of the armature for varying the influence of the fields on the armature to control the movement and positioning thereof. With operation of the actuator member between its given positions, the armature is caused to move between preassigned positions in a snap action like movement. Once the armature has moved to a new position, the magnetic field which was effective in moving the armature thereto is also operative to hold the armature thereat with a strong holding force and in certain embodiments the other magnetic field restrains the actuator in its new position. Contacts for the switch are operated by the armature with the movement thereof between its several positions.

The switches taught in the copending application are unique in that they provide means of actuating an armature within an inflexible and hermetically sealed enclosure by a practical method possessed of reliability at least equivalent to that commonly employed in unsealed switches. The switch is also simple and practical in construction, and of an increased life expectancy which is not made uncertain by fatigue of flexible metal diaphragms commonly employed in most known types of hermetically sealed switches.

There is also a need in certain arts for a switch having these characteristics in which the operation of the armature between its positions is desirably effected only in response to the performance of one or more predetermined or contingent operations, and it is a specific object of this invention to provide a novel switch structure which answers such problems.

It is a specific object of the invention to provide auxiliary actuator means for the armature, each of which is operable between at least two positions to effect a corresponding movement of the armature or to alternatively influence the operation of the armature with further movement of the other actuator members.

The switch of this disclosure lends itself to numerous applications in which contact operation is to be permitted only after the performance of one or more predetermined operations or the establishment of one or more contingent conditions. It is also useful in arrangements in which one further contact operation is to be permitted and thereafter the armature is to be non-responsive to further movement of the primary actuator alone.

Numerous other applications are to be found in the specific details of the novel switch as set forth in the following descriptions and drawings in which Figures 1 and 2 illustrate the elements of the switch member of one embodiment in which the armature is in a position determined by and corresponding to the position of the primary actuator and the auxiliary actuators are in a non-effective or nonoperative position;

Figure 3 illustrates the novel switch member of Figure 1 with both auxiliary actuators in their operative positions modifying the magnetic fields so that the primary actuator may be moved without effecting operation of the armature;

Figures 4 and 5 each illustrate the switch with one auxiliary actuator moved to its operative position while the primary actuator is adjacent the magnet associated with that auxiliary actuator member, and the armature rests at the normal position dictated by the main actuator;

Figures 6 and 7 each illustrates the switch with one auxiliary actuator moved to its operative position during the period that the actuator is adjacent the magnet associated with the opposite auxiliary actuator means;

Figures 8, 9 and 10 illustrate a switch member having auxiliary actuator means operable into position adjacent the primary switch actuator;

Figure 11 illustrates a switch embodiment in which the auxiliary actuator means are operative into effective positions which lie between the primary actuator and the magnet members;

Figures 12, 13 and 14 illustrate a switch embodiment in which the auxiliary actuator means are operable into effective positions which lie adjacent the magnet members; and Figures 15 and 16 illustrate a gang switch arrangement in which a plurality of switches are controlled by a common actuator member.

Basic switch structure

Figure 1:
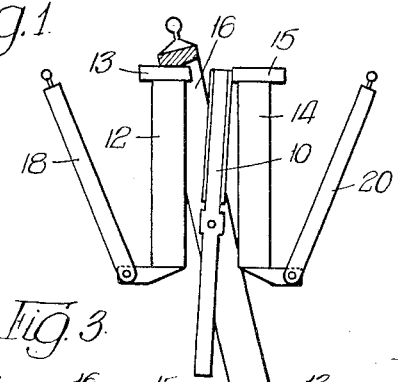

The switch member in each embodiment basically comprises a magnetic armature 10 pivotally mounted between a first permanent magnet 12 and a second permanent magnet 14.

An actuator member 16 influences the fields of the magnets 12 and 14 to effect the movement of the armature 10 between its two stable positions. Actuator member 16 basically comprises a magnetic member which is mechanically independent of the armature and which is mounted for operation between two given stable positions.

Figure 2:
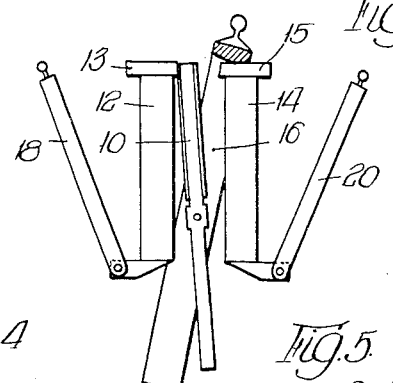

The actuator member may assume any convenient form and according to a first switch embodiment shown in Figures 1 and 2, comprises a U-shaped actuator of magnetic material, the legs of which are pivoted at the approximate balance point of the actuator so that the legs extend along the exterior sides of the housing. The handle located on the base facilitates movement of the actuator to bring the base of the actuator to positions of rest alternatively adjacent the pole-piece end 13 of magnet 12 or the pole-piece end 15 of magnet 14.

As shown in Figure 1, with movement of the base end of the actuator 16 to bring same to rest over the pole-piece end 13 of the magnet 12, the fields of the magnets 12 and 14 are altered relative to the armature 10 to influence same to move to a position adjacent the pole-piece end 15 of the magnet 14. The magnet 14 holds armature 10 and the magnet 12 holds the actuator 16 securely in such positions as moved thereto.

With movement of the actuator 16 to its position adjacent the outer end of the magnet 14 (Figure 2), the fields of the magnets 12 and 14 are altered to move the field responsive end of the armature 10 to a position adjacent the pole-piece end of the magnet 12. The static field of the permanent magnet 12 holds the magnetic armature 10 and the static field of the permanent magnet 14 holds the actuator 16 securely in these positions as moved thereto.

According to the invention, auxiliary actuator members, such as 18 and 20, are provided to further influence the magnetic fields, and thereby alter the response of the armature to the movement of the primary actuator 16. Additionally the sequence of operation of the auxiliary actuator members may be altered to vary the conditions precedent under which further operation of the armature may be effected.

Switch embodiment of Figures 1-7

The switch as shown in Figures 1-7 inclusive includes a first and second auxiliary actuator means 18 and 20, each of which is comprised of a piece of magnetic metal of approximately the same length as the permanent magnets 12 and 14, and of cross section sufficient to accomplish the desired shunting action. It should be understood that a member of lesser length and proportionately different cross section may be used to effect a similar shunting result. The auxiliary actuator means 18 and 20 are pivotally mounted for arcuate movement between effective positions adjacent magnets 12 and 14 respectively and noneffective positions sufficiently remote therefrom to prevent influencing of the magnet fields by the auxiliary actuators. The auxiliary actuator means 18 and 20 may be arranged for independent or simultaneous movement.

Figure 3:
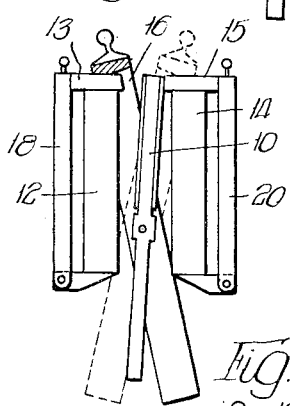
Figure 4:
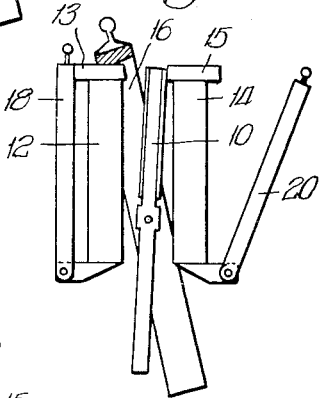

Figures 1 and 2 illustrate the auxiliary actuator means 18 and 20 in their ineffective positions, while Figure 3 illustrates the auxiliary actuator means 18 and 20 in their effective positions.

Switch operation

Armature movement between its two stable positions with the auxiliary actuator means in their noneffective positions (Figures 1 and 2) is accomplished by reducing to a release point the magnetic field of the particular permanent magnet means which is effectively holding the armature at the time, and simultaneously rendering the field of the other permanent magnet effective relative to the armature.

Briefly, with the auxiliary actuator means in their noneffective positions and the actuator 16 in the stable position in which its base end lies adjacent the pole-piece end of magnet 12 (Figure 1), the field responsive end of the armature member 10 will be in its position against the pole-piece end of magnet 14, a firm stable position being provided for the actuator 16 and armature 10 in that the actuator 16 and the armature 10 provide high permeability return paths for flux emanating from the pole-pieces of magnets 14 and 12 respectively.

The flux distribution through the leakage flux return path at the lower ends of the magnets 12 and 14 exerts negligible rotationable movement upon the armature 10 and the actuator 16, the distribution of flux at the pole-piece ends of the magnets being the primary factor in effecting rotation of the armature 10 about its axis.

As the magnetic actuator 16 is now manually displaced from its position adjacent the magnet 12 toward its position adjacent the opposite magnet 14 (Figure 2), the flux distribution alters so that more and more flux from the magnet 12 threads the armature 10. Simultaneously the flux from the magnet 14 which is threading the armature 10 is being reduced by the fact that the actuator 16 is providing an alternate path for the flux emanating from the end of the magnet 14. As the magnetic actuator 16 approaches the magnet 14, the flux distribution is gradually shifted to a point where the magnet 12 exerts a greater tractive force on the armature 10 than magnet 14, whereupon a very speedy transfer of the armature from its position adjacent the magnet 14 to its position adjacent magnet 12 is effected. The movement of the armature is of a snap action characteristic due to the greater than linear build-up of the actuating force on the armature 10 for each progressive increment of its motion towards its other stable position.

In like manner with movement of the actuator 16 toward its position adjacent the magnet 12, the armature 10 is snapped back into its position adjacent magnet 14. Reference is made to the aforementioned copending application Serial No. 273,296 for a more detailed explanation of the switch and its operation.

Switch of Figures 1-7

OPENING OF ARMATURE ACTUATOR SIMULTANEOUSLY AND INDEPENDENTLY

With the movement of each of the auxiliary actuator means 18 and 20 of the switch illustrated in Figures 1-7 to their effective positions adjacent their associated magnets 12 and 14, as shown in Figure 3 (also referred to hereinafter as their closed positions) the armature 10 will no longer respond to the operation of the actuator 16 between its several positions. That is, with the auxiliary actuator means 18 and 20 in their closed positions, the primary actuator 16 may be moved to either of its operative positions and the armature will remain stationary. Assuming the actuator 16 is in its position adjacent magnet 12, and armature 10 is positioned adjacent magnet 14 (as shown in Figure 1), and the auxiliary actuator means 18 and 20 are now moved to their effective positions (Figure 3) the actuator 16 may now be moved between its operating positions and armature 10 will remain in its assumed position adjacent magnet 14. Similarly with the armature 10 in its position adjacent magnet 12 as the auxiliary actuator members 18 and 20 are moved to their effective positions, the actuator may be moved between its two positions, and the armature 10 will remain in its position adjacent magnet 12.

As auxiliary actuator means 18 and 20 are moved to their noneffective positions (also referred to hereinafter as their open positions), armature 10 will once more respond to the operations of actuator 16.

Movement of the auxiliary actuator means to their effective and noneffective positions at different time intervals will correspondingly alter the periods during which the armature will respond to the actuator, it being apparent that these differences in operation may be used to provide conditions precedent to be performed to effect desired armature operations. For example, with the closing of the auxiliary actuator means 18 and 20 while the actuator 16 and the armature are in the positions shown by the solid lines in Figure 3, the actuator 16 may be moved to either of its positions without effecting movement of the armature 10 from its illustrative position. If the auxiliary actuator means 18 and 20 are moved to their noneffective positions when the actuator 16 is in the position assumed when the auxiliary actuators were closed no armature operation is accomplished as the opening operation is now performed. However, assuming the actuator 16 is in the position illustrated in dotted lines in Figure 3 and both auxiliary actuator means 18 and 20 are moved to their open or noneffective positions, the armature 10 will snap into position adjacent the pole piece end of magnet 12.

Alternatively the auxiliary actuator means 18 and 20 may be moved to their noneffective positions independently. In such event if the auxiliary actuator means 20 is moved to its noneffective position before auxiliary actuator means 18 is moved to its noneffective position, armature 10 will remain in its position adjacent the pole-piece end of magnet 14 with actuator 16 remaining in its position adjacent magnet 14, and as auxiliary actuator means 18 is subsequently moved to its noneffective position, armature 10 will automatically snap into its position adjacent magnet 12. If auxiliary actuator means 18 were moved to its noneffective position before auxiliary actuator means 20 were moved to its noneffective position the armature would snap into its position adjacent the pole-piece end of magnet 12 and the subsequent operation of the auxiliary actuator means 20 to its non-effective position would cause no armature operation.

It is apparent that with the armature 10 and actuator 16 in the positions shown in Figure 2 as the auxiliary actuator means 18 and 20 are closed (moved to their effective positions), and the actuator 16 is thereafter moved into its position wherein it is in parallel relation with armature 10, the movement of auxiliary actuator means 18 to its noneffective position alone will be without effect upon armature 10. That is, armature 10 will remain in its position adjacent magnet 12 in parallel relation with actuator 16. However, if auxiliary actuating means 18 is maintained in its effective position, and auxiliary actuator means 20 is moved to its noneffective position, armature 10 will snap into its position adjacent magnet 14.

It is seen from the foregoing that by linking the shunting means and the actuator to various manual, mechanical or electrical control equipments, and varying the sequence of operation of the actuator 16 and the auxiliary actuator means 18 and 20 to their open or noneffective positions, various types of circuits and switch control operations may be accomplished by the armature 10 and its associated contacts. These operations may be further modified by varying the sequence of operation of the auxiliary actuator means to their closed or effective positions as will become apparent from the following more detailed description.

*Operation of auxiliary actuator means to effective positions in various sequences*

Assuming the armature 10, actuator 16 and auxiliary actuator means 18 and 20 to be in the position illustrated in Figure 1, as the auxiliary actuator means 18 is now moved into its effective or closed position, and auxiliary actuator means 20 is maintained in its open position, armature 10 will be maintained locked in its assumed position independent of further movement of the actuator 16. That is, with movement of the auxiliary actuator means 18 to its position adjacent magnet 12 (Figure 4), the flux of magnet 12 will thread the shunt 18 as well as the actuator 16 and the effective flux from magnet 12 which threads armature 10 will be substantially reduced by reason of the higher permeability return path for the flux of magnet 12 as provided by shunt 18. Accordingly as the actuator 16 is moved adjacent the pole-piece end of magnet 14, the armature 10 will remain in its position adjacent magnet 14, whereby armature 10 and actuator 16 are in a substantially parallel aligned relation. Movement of the actuator 16 between its positions during this switch condition, will have no operating effect upon the locked armature 10. Operation of the armature may be rendered dependent upon opening of the auxiliary actuator means 18 and 20 in various sequences as described hereinbefore.

Figure 5:
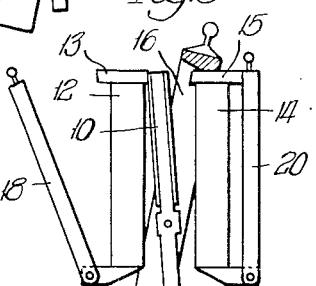
Figure 6:
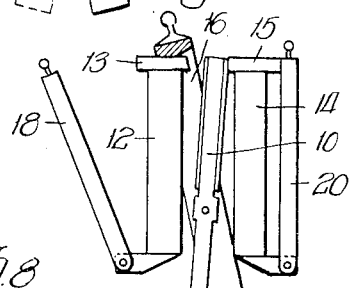

Assuming now the armature 10, actuator 16 and auxiliary actuator means to be in position shown in Figure 2, as shunt means 20 is moved into its closed or effective position as shown in Figure 5, armature 10 is maintained locked in the position shown. That is, the higher permeability return path for the flux emanating from the magnet 14 as now provided by the adjacent shunt means 20 substantially reduces the amount of flux which will thread the armature 10, and as the actuator 16 is subsequently moved into its position adjacent the magnet 12, the operation of the armature 10 to its position adjacent magnet 14 is prevented. The armature 10 and actuator 16 will now be in substantially parallel relation adjacent magnet 12. Actuator 16 may be moved between its positions without obtaining response from the armature 10 which remains in its position adjacent magnet 12. It is apparent that the movement of the armature with opening of auxiliary actuator means 20 may be controlled by obtaining the switch condition and sequential operations heretofore described.

*Preparatory armature locking operations*

Assuming now the armature 10, the actuator 16 and the auxiliary actuator means 18 and 20 to be in the position shown in Figure 1, as the auxiliary actuator means 20 is moved to its effective position adjacent magnet 14, and the auxiliary actuator means 18 is retained in its noneffective position (Figure 6), a higher permeability return path for the flux emanating from the magnet 14 is provided by the shunt 20, and a preparatory lock is prepared for armature 10. That is, with movement of the actuator 16 to its position adjacent magnet 14, armature 10 will be moved to its position adjacent the magnet 12. At this point the switch elements will be in the condition shown in Figure 5, and as set forth in the above description, armature 10 is held in such position. Actuator 16 may be moved back and forth between its two positions without effecting movement of the armature 10 from its position adjacent magnet 12.

Figure 7:
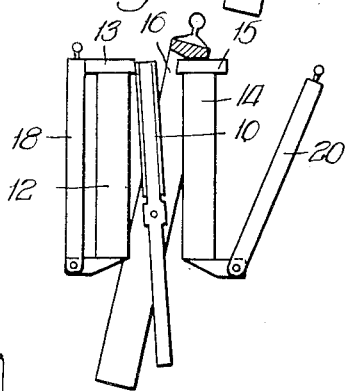

Assuming the armature 10, the actuator 16 and the auxiliary actuator means 18 and 20 to be in the position shown in Figure 2, movement of the shunt means 18 to its operative position adjacent the magnet 12 (as shown in Figure 7) will reduce locking of armature 10 to magnet 12, but no transfer will occur until actuator 16 is also moved to further reduce the holding field below the critical value. That is, movement of actuator 16 thereafter to its position adjacent magnet 12 will effect movement of the armature 10 to a position adjacent magnet 14. At this point the movable members of the switch will be in the position shown in Figure 4, and as set forth in the description relative to such figure the armature is now held in its position adjacent magnet 14. Movement of the main actuator 16 between its two positions will obtain no operation of the armature. Unlocking of the armature 10 may be effected as heretofore described.

There has been set forth hereinbefore a novel switch member in which a contact-moving armature member, such as 10, may be operated between two stable positions through the agency of an associated actuator such as 16 and the means of permanent magnet members, such as 12 and 14. Auxiliary actuator means 18 and 20 make possible the locking of the armature in a given position independent of further operations of the primary actuator. Auxiliary actuator means 18 and 20 may also be used to adapt the switch for operation only in response to the performance of certain predetermined operation. These and other basic features are also taught in the switch embodiments described hereinafter.

*Magnetic shunt for external actuating magnets*

Figure 8:
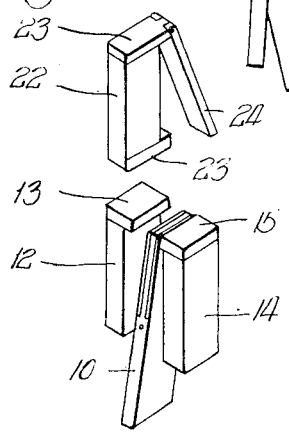

According to a further embodiment of the novel switch structure, the actuator means for the switch may comprise a permanent magnet or an electromagnetic actuator which is mounted externally of the switch for movement between two predetermined positions to effect corresponding movement of the switch armature between two given positions. Such switch arrangements were shown in Figures 2 and 3 of my aforementioned copending application having Serial No. 273,296. A switch of this basic type including auxiliary actuator means 24 is shown in Figure 8 of the drawings. The switch arrangement as there illustrated comprises a magnetic armature 10 pivotally mounted between a first permanent magnet 12 and a second permanent magnet 14 for operation between two given stable positions responsive to movement of an actuator 22 between its two stable positions.

The actuator means 22 comprises a permanent magnet or an electromagnetic actuator as taught by Figures 2 and 3 in the aforementioned copending application. In switch structures of this type, the magnets 12 and 14 will be aligned with like poles facing the actuator end, and the pole of the actuator 22 facing the magnets 12 and 14 will be of a polarity opposite to that of the adjacent magnet ends. As in prior switch embodiments, the magnets will preferably have pole-pieces 13 and 15 to provide a more concentrated magnetic field. With movement of the actuator 22 adjacent the pole of magnet 12 as shown in Figure 8, a neutral magnetic region is effected at the upper end of armature 10 and the flux responsive end of the armature 10 will respond to the flux emanating from the pole-piece end of magnet 14 and move to a position adjacent thereto. It is apparent that with movement of the actuator 22 from its position above and adjacent the pole-piece end of magnet 12 toward the pole-piece end of magnet 14, the flux distribution alters so that more and more flux from the magnet 12 threads armature 10, while simultaneously the flux threading the armature 10 from the magnet 14 is being reduced by the fact that the actuator 22 is neutralizing the flux emanating from the end of the magnet 14. As the magnet 22 approaches the magnet 14, the flux distribution is gradually shifted to a point where the magnet 12 exerts a great tractive force on the armature 10 than the magnet 14, whereupon a very speedy transfer of the armature from its position adjacent the magnet 14 to its position adjacent the magnet 12 is effected. Such armature movement is effected with a snap action characteristic due to the greater than linear build-up of the actuating force on the armature 10 for each progressive increment of its motion towards its other stable position.

With movement of the magnet 22 back to its position shown in Figure 8, the armature 10 is operated to its position adjacent magnet 14 in the manner described.

Figure 9:
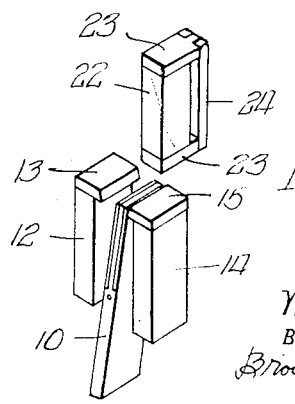

Auxiliary actuator or shunting means 24 are mounted adjacent magnet 22 for movement into a closed position immediately adjacent to actuator 22 and into an open position away from said magnet. Pole-piece members 23 are located at the respective ends to provide a more effective path for the magnetic flux. The shunting means 24 alternatively renders effective and noneffective the actuator 22 in its influencing of the fields of magnets 12 and 14. That is, with operation of the auxiliary actuator means 24 to the position shown in Figure 9 immediately adjacent the pole-pieces of actuator 22, a high permeability return path for the flux emanating from the magnet 22 is provided, and the influence of the actuator upon the fields of magnets 12 and 14 is so reduced that the armature 10 remains stationary in the position assumed prior to movement of the auxiliary actuator means adjacent the actuator 22. The shunt or auxiliary actuator 24 may of course be supported in any conventional manner and is movable between magnets 12 and 14 along with actuator 22. The auxiliary actuator may also take the form shown at 24a in Figure 10, wherein the auxiliary actuator is of sufficient length to effectively shunt the actuator 22 in either of the actuator positions by merely moving the auxiliary actuator member toward and away from actuator 22.

In a further switch embodiment set forth in Figure 11, a permanent magnet actuator or an electromagnetic actuator such as 22 is utilized with auxiliary actuator means, such as 26, which may comprise a thin magnetic barrier or shield operable as a shunt means into and out of position between an external actuator 22 of either the permanent magnet or electromagnet type and the magnets 12 and 14. As shown in Figure 11 the magnetic barrier 26 is positioned between the actuator and the pole-piece end of magnet 12, and in this position effectively restrains armature 10 against movement toward magnet 14. It is apparent that the magnetic barrier may in turn be inserted between the end of actuator 22 and the pole-piece end of magnet 14 to influence the operation of the armature in the manner of the auxiliary actuator means heretofore described. Alternatively the shield 26 may be inserted between the actuator 22 and both of the magnets 12 and 14.

A particular advantage of this arrangement is the inherent flexibility of the auxiliary actuators and the linkage used therewith. The nature of the auxiliary actuator means 26 is such as to permit movement in any direction and entry between any one or both of the magnets and actuator from a number of different positions. The reaction of the armature to the various positions of the barrier are believed to be evident from the foregoing description of the switch embodiment of Figures 1–7 inclusive.

In a further switch embodiment as set forth in Figures 12 and 13, an auxilary or shunt actuator 16a is supported to be moved into parallel adjacent relation alternatively with magnets 12 and 14 to effect the corresponding operation of the armature 10 between alternative positions adjacent magnets 14 and 12 respectively. A side plate shunt member 28 is hinged at its lower end for movement into and out of position adjacent the magnets 12 and 14. With the plate shunt member 28 in position adjacent the magnets 12 and 14, the high permeability return path for the flux emanating from the magnets and extending through the shunt plate 28 will render the primary actuator 16a inoperative relative to the armature 10. That is, with movement of the actuator 16a between its positions adjacent magnets 12 and 14 respectively, the armature 10 will remain stationary.

With the side plate 28 in its non-operative position, the armature 10 will respond to movement of the actuator 16a much as in the manner of the embodiment set forth in Figures 1–7 inclusive.

It is apparent that the basic switch arrangement of Figure 8 wherein the permanent magnet actuator 22 effects movement of an armature 10 between two stable positions may be modified to include a side plate auxiliary actuator member 28, such as shown in Figure 14, instead of the auxiliary actuator means 24 shown in Figure 8. In such arrangement the side plate 28 would be pivotally supported for movement into positions adjacent to and remote from the magnets 12 and 14. With the side plate shunt 28 in position adjacent the magnets, operation of the actuator 22 between its positions adjacent magnets 12 and 14 would obtain no movement of armature 10.

It is also apparent that combinations of the auxiliary actuator means of Figures 8 and 12 and others in the application may readily be incorporated in a single switch structure.

The manner in which the basic switch structure of Figure 11 may be incorporated in a switching arrangement in which a single actuator controls several switch members is set forth in one embodiment in Figures 15 and 16.

As there shown a series of switches 30 may be arranged in side by side relation and a common magnetic barrier member 26 mounted between the permanent magnetic actuator 22 and the permanent magnets 12 and 14 of each of the switches. The magnetic barrier member may consist of a common thin plate of magnetic material having apertures, such as 32, positioned in the plate in such manner that the neutralizing effect of permanent magnet actuator 22 as provided for its associated pole member 12 and 14 will be interrupted by the solid portions of locking member 26, and will be made effective when aperture 32 is moved to a position between actuator 22 and magnets 12 and 14. Accordingly the magnetic barrier member 26 may be moved to render the actuators 22 effective or non-effective.

It is apparent that the actuator members may be linked to common operating members in certain configurations (at right angles to the position illustrated in Figure 15 for example) and accordingly the armatures of each of the switches may be subject to and contingent upon the movement of a common magnetic barrier member 26 and a common gang member discussed.

It is further noted that the switch illustrated in Figures 1-7 inclusive could be likewise operated in a gang arrangement whereby the equivalent operation experienced in the moving of the apertures of a common plate member adjacent the plurality of the switches would be accomplished. That is, with operation of a common member running between the switches the secondary actuators 18 and 20 of a plurality of switches could be simultaneously operated. Furthermore the position of the primary actuators 16 could also be gang controlled.

The gang switch arrangement lends itself to particular use for example in a crossbar switch of the type used in the telephone field. Other uses are apparent to parties skilled in the art.

Conclusion

There has been shown herein a switch member in which the operation of an armature of a switch may be made subject to the performance of precedent conditions on other members of the switch, and whereby the armature may be locked in a given position independent of the movement of an associated primary actuator member. Thus, a magnetically operated switch is achieved which is in effect the counterpart of a multi-grid electronic tube wherein a plurality of grids must be conditioned to effect conduction of a tube. It is of course apparent that the plurality of shunt members affecting the static field producing magnet or magnets or effecting the actuating magnet or effecting both or all modifications which are within the scope of the present switch disclosure.

The flexibility of the switch is indicated by the manner in which the auxiliary actuator means may be effectively applied to various embodiments of the switch. The manner for example in which individual actuators may be applied to each of the field means and the alternative manner in which a movable magnetic shunt may be applied to an external actuating magnet or coil are illustrative of the flexibility of the arrangement.

The structure of the various elements of these switches may be likewise modified without departing from the spirit of the invention. The armature 10 for example may take the form of two thinner armature bars notched for the hinge pin and placed together with the notches matching to form a hinge pin aperture. An insulator may be inserted between the thinner bars if desired but it is apparent that a degree of flux segregation may be obtained even without the use of an insulator.

The armature may be guided in its movement by various alternative means such as slide pins or guide channels. The motion of the armature may be augmented or biased by the introduction of auxiliary springs or opposing magnetic forces, all of which are considered to be within the spirit and scope of the invention.

Size, shape, number and disposition of the elements may be varied in accordance with particular application of the switch as may be required. It is within the scope of the invention for example to vary the size, shape, number and disposition of the armatures, actuators, permanent magnets or electromagnets, pole-pieces, air gaps and contact structures. Whereas in the illustrated embodiment the switch structure is maintained stationary and the actuator is movable, it is apparent that actuation of the armature is determined by the relative movement of the actuator and the switch structure, and therefore either the actuator or the switch structure itself can be moved with the correlating part being maintained stationary.

The use of a solenoid or relay coils to drive the actuator through the means of a mechanical linkage is of course obvious. A feature of such arrangement is the high contact pressure which is provided either in the make or break position of the contacts even though the associated relay coils or solenoids have been deenergized.

It is also apparent that the present structure lends itself to hermetic sealing much in the matter of the embodiments disclosed in the heretofore identified copending applications.

The structure lends itself to dynamic balance whereby the equal distribution of moments plus the great attractive force of the pole-piece holding the armature affords a high measure of shock and vibration resistance.

Motion of the magnetic actuator prior to operation of the armature may be controlled over a wide range of values by varying:

a. The air gaps including total armature travel and influence of non-magnetic shims between the armature and pole-pieces.

b. The clearance between the magnetic actuator and the pole-pieces.

c. Contact lever spring pressures which must be overcome by the armature in forcing the contacts closed or open as the case may be.

In that the switch inherently includes permanent magnet means, it is possible to include magnet blow out without introducing further ancillary permanent magnet equipment, this feature having been more fully disclosed in my copending application which was filed December 4, 1953, and received Serial No. 396,127 and was assigned to the assignee of this invention.

It is to be understood that the distances between the various components shown in the drawings are not definitive, operative relations being apparent to parties skilled in the art with the application previoulsy identified herein.

Other inherent advantages, features and applications of the switch will be immediately apparent to parties skilled in the art, and are to be considered within the scope of the present invention.

What is claimed is:

1. A switch comprising an armature member having at least two stable positions, magnetic field producing means, primary actuator means operative to complete alternative paths for the flux of said field producing means to control said armature to move to positions corresponding to the particular path established, and secondary actuator means for rendering said armature nonresponsive to said operations of said primary actuator.

2. A switch comprising an armature member having at least two stable positions, magnetic field producing means operative to exert a holding force on said armature in each of its positions, actuator means operative to various positions to provide alternative paths for the flux of said field producing means to reduce said holding forces and to effect movement of said armature to correspondingly different positions, and secondary actuator means operative to interrupt the flux path provided by said primary actuator to render said primary actuator ineffective in operation of said actuator to its various positions.

3. A switch comprising an armature member having at least two stable positions, magnetic field producing means, primary actuator means operative to various positions ot provide correspondingly different paths for the flux of said field producing means, each path controlling said armature to move to a correspondingly different position, and secondary means for shunting said flux paths to prevent response of said armature to movement of said primary actuator to its several positions.

4. A switch comprising an armature member having at least two stable positions, magnetic field producing means, primary actuator means operative to various positions to provide correspondingly different paths for the flux of said field producing means, each path controlling said armature to move to a correspondingly different position, and magnetic means operable into a position between said primary actuator and said field producing means to prevent movement of said armature responsive to movement of said primary actuator to its several positions.

5. A switch comprising an armature member movable between at least two stable positions, static magnetic field producing means operative to provide a magnetic field at each armature position for maintaining said armature stable in each of its positions as moved thereto, primary actuator means operative to several positions and held by an adjacent one of said fields as moved thereto, magnetic paths completed by said primary actuator with movement toward the field having the armature adjacent thereto to decrease the effective holding flux exerted on said armature by its adjacent field and to simultaneously render effective the force exerted on said armature by the field adjacent its other position and secondary actuator means operative to minimize the effect of the magnetic field producing means at the other armature position sufficiently to prevent movement of the armature thereto responsive to operation of said actuator between its various positions.

6. A switch member comprising an armature member movable between two given positions, a first permanent magnet supported adjacent one of said armature positions to maintain same stable with movement thereof to that position, a second permanent magnet supported adjacent the second one of said armature positions to maintain same stable in its movement to its second position, and actuator means movable to a position adjacent said first permanent magnet and alternatively to a position adjacent said second permanent magnet and operative to complete predetermined paths for said magnet flux at each position which influence said armature to move into a corresponding position, and permanent magnet shunting means movable into position adjacent said first and second magnet means to provide a shunt path for the flux of the adjacent field relative to the paths established by said actuator to thereby render said armature nonresponsive to operation of said actuator.

7. An electrical switch comprising a housing, an armature member in said housing operable between two positions to control associated contact members in the completion and interruption of given electrical circuits, static magnetic force producing means in said housing for maintaining said armature stable in each of its positions as moved thereto, actuator means mounted externally of said housing in physically unattached relation to said armature operative between two positions to provide flux paths in each position for operating said armature to a corresponding one of its positions, and auxiliary actuator means for each magnetic field producing means mounted externally of said housing for movement into a first position adjacent its associated field producing means to provide a flux path of higher permeability than the path extending over said primary actuator, and into a second position remote from said flux producing means.

8. A switch member for controlling associated electrical circuits comprising a first permanent magnet and a second permanent magnet mounted in parallel spaced relation, an armature member pivotally mounted therebetween for positioning of one end thereof alternatively adjacent one end of said first and said second magnet, a magnet actuator member mounted for movement between a first position adjacent said end of said first magnet and alternatively a second position adjacent said end of said second magnet to provide predetermined paths for the flux of said fields which operate the armature to a corresponding one of its positions, and auxiliary actuator means operable to a position adjacent said actuator to provide a path for the flux of said primary actuator which is of higher permeability than the path extending over the adjacent one of the fields.

9. A switch as set forth in claim 8 in which said first and said second magnet members have like poles disposed at said one end and said magnet actuator is mounted with a pole of opposite polarity movable adjacent said one end of said first and second permanent magnet means.

10. A switch as set forth in claim 8 in which said magnet actuator member is supported with one of its poles disposed for movement into a position adjacent the one pole of said first magnet and alternatively a position adjacent said second magnet member, and said auxiliary actuator means are movable into field shunting relation with said secondary actuator in either of its positions.

11. A switch member for controlling associated electrical circuits comprising a first permanent magnet and a second permanent magnet mounted in parallel spaced relation, an armature member pivotally mounted therebetween for positioning of one end thereof adjacent one end of said first magnet and alternatively adjacent one end of said second magnet, a magnet actuator member mounted for movement into each of several predetermined positions to complete predetermined paths for the fields of said first and second magnets which effect movement of the armature to a corresponding position, and auxiliary actuator means operable into a position adjacent said magnet actuator member to shunt the field thereof relative to said first and second magnets, and mounted for movement with said magnet to each of its several positions.

12. A switch comprising an armature member having at least two stable positions, a first permanent magnet and a second permanent magnet mounted in parallel spaced relation, an armature member pivotally mounted therebetween for positioning of one end thereof adjacent one end of said first magnet and alternatively adjacent one end of said second magnet, a magnet actuating member mounted for movement of one pole thereof alternatively adjacent one end of said first magnet and one end of said second magnet to complete predetermined paths for the fields thereof in each position which effect movement of said armature to a corresponding position, and auxiliary actuator means of a magnetic material operable into a position between said magnet actuator member and either of said permanent magnets.

13. A switch comprising an armature member having at least two stable positions, magnetic field producing means, primary actuator means operative to various positions to provide correspondingly different paths for the flux of said field producing means, the flux distribution in each of said primary actuator positions controlling said armature to move to a correspondingly different position, and auxiliary actuator means simultaneously operative into position adjacent both of said magnetic field producing means to shunt both means simultaneously.

14. An arrangement set forth in claim 13 in which said primary actuator means comprises a magnet member having one end thereof disposed for movement adjacent said first and second field producing means to provide different predetermined paths for the fields thereof which effect movement of the armature to a corresponding one of its positions, and in which said auxiliary actuator means comprises a plate member operable to a position to simultaneously shunt said first and second field producing means to render said armature ineffective to further movement of said primary actuator.

15. A switch member for controlling associated electrical circuits comprising a first permanent magnet and a second permanent magnet mounted in parallel spaced relation, an armature member pivotally mounted therebetween for positioning of one end thereof alternatively adjacent one end of said first magnet and one end of said second magnet, a magnetic shunt member mounted for movement to given positions to complete different predetermined paths for the field of said first and second magnets to thereby effect a corresponding movement of said armature, and auxiliary actuator means comprising a shunt plate member which is of a size to extend coextensively with said first and second permanent magnets including means for mounting same for movement into adjacent relation simultaneously with said first and second magnet to shunt same relative to said armature.

16. A gang switch comprising a group of unit switches each of which includes an armature member having at least two stable positions, magnetic field producing means and primary actuator means operative to complete alternative paths for the flux of said field producing means to control said armature to move to positions corresponding to the particular path established; and a common secondary actuator means for said group of switches mounted for movement to a plurality of positions and operative in each position to interrupt and prepare different predetermined ones of said operation paths for said switch armatures.

17. A gang switch comprising a group of units each of which includes an armature member having at least two stable positions, magnetic field producing means, and primary actuator means operative to complete alternative paths for the flux of said field producing means to control said armature to move to positions corresponding to the particular path established, a secondary actuator means common to said group of switches comprising a plate member of magnetic material having apertures located therein, and means for moving said plate member into various positions to bring in each position, predetermined ones of said apertures and corresponding solid portions of said plate into position between the various switch actuators and their associated field producing means.

References Cited in the file of this patent

UNITED STATES PATENTS

| | | |
|---|---|---|
| 265,485 | Cochran | Oct. 3, 1882 |
| 1,891,568 | Morris | Dec. 20, 1932 |
| 2,323,910 | Hubbell | July 13, 1943 |